United States Patent [19]

Lempelius

[11] Patent Number: 5,039,055
[45] Date of Patent: Aug. 13, 1991

[54] ADJUSTABLE AND EXTENDABLE MOUNT FOR REAR VIEW MIRROR

[75] Inventor: Steven Lempelius, Minneapolis, Minn.

[73] Assignee: Luverne Truck Equipt. Inc., Brandon, S. Dak.

[21] Appl. No.: 583,953

[22] Filed: Sep. 17, 1990

[51] Int. Cl.⁵ ............................................. A47G 1/24
[52] U.S. Cl. ..................................... 248/480; 248/485
[58] Field of Search ............... 248/480, 476, 479, 485, 248/466; 350/639, 604, 625, 636, 616

[56] References Cited

U.S. PATENT DOCUMENTS

| | | | |
|---|---|---|---|
| 795,602 | 7/1905 | Fyfe | 248/480 |
| 2,458,117 | 1/1949 | Tolbert | 248/480 X |
| 2,705,122 | 3/1955 | Whitehead | 248/480 X |
| 4,711,538 | 12/1987 | Ohs | 350/604 |
| 4,715,701 | 12/1987 | Urban | 350/625 |
| 4,730,913 | 3/1988 | Boothe | 350/604 |
| 4,909,619 | 3/1990 | Eifert | 350/636 |
| 4,940,320 | 7/1990 | Tribble | 350/616 |

FOREIGN PATENT DOCUMENTS 238699  8/1925  United Kingdom ................ 248/480

OTHER PUBLICATIONS

Byer's Extend-A-Mirror.

Primary Examiner—J. Franklin Foss

[57] ABSTRACT

A mounting for a rear view mirror on a vehicle in which the distance of the mirror from the outside of the vehicle can be varied to allow rear vision when wide loads or a wide towed device might otherwise interfere. The adjustment is made possible by using a telescoping tube capable of being clamped in various adjusted positions.

1 Claim, 1 Drawing Sheet

ADJUSTABLE AND EXTENDABLE MOUNT FOR REAR VIEW MIRROR

BACKGROUND AND SUMMARY OF THE INVENTION

This invention pertains to mountings and hardware for external rear view mirrors for pickup trucks, vans or similar vehicles on which an extending mount would be desirable. For example, a wide load on the truck or a wide recreational vehicle being towed by a van or truck might indicate the need for such a mount.

Rear view mirrors are customarily required outside both sides of the cab of a vehicle. As provided by the original equipment manufacturers and dealers, these mirrors are mounted at a fixed length from the vehicle to which they are fastened. Adjustment of the mirror head is ordinarily possible angularly both in a horizontal plane and in a vertical plane, but not laterally.

However, in many applications, there are times when loads on a pickup or trailers or the like being pulled by other vehicles may be somewhat wider than the outboard edge of the mirror head. Such loads may cause the restriction or complete obstruction of a rear view.

In such cases, it may be highly desirable, if not absolutely necessary, to move the mirror outwardly so that it extends beyond the load. Attachment devices providing lateral extension have been used, but all of them require auxiliary attachment.

By my invention I provide a replacement mirror head and extension arm which uses the original mirror mount. It is attractive and easy to adjust so that it may be extended in very short time.

DESCRIPTION

Figure 1:
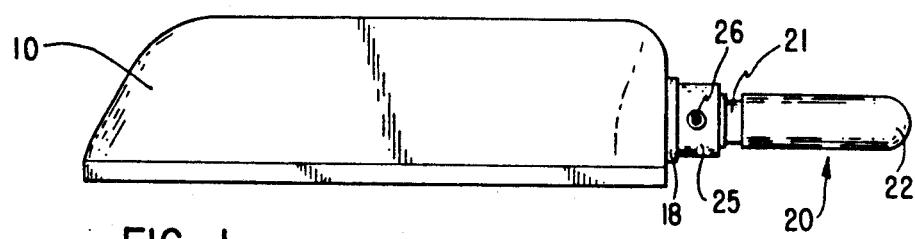
FIG. 1 is a top plan view of an exterior mirror and its mounting tube assembly.
Figure 3:
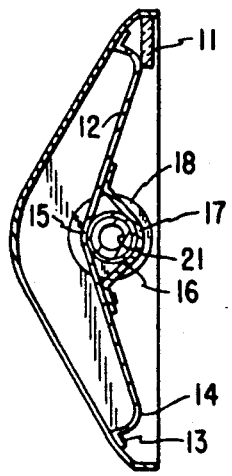
FIG. 3 is a sectional view from line 3—3 of FIG. 2.
Figure 2:
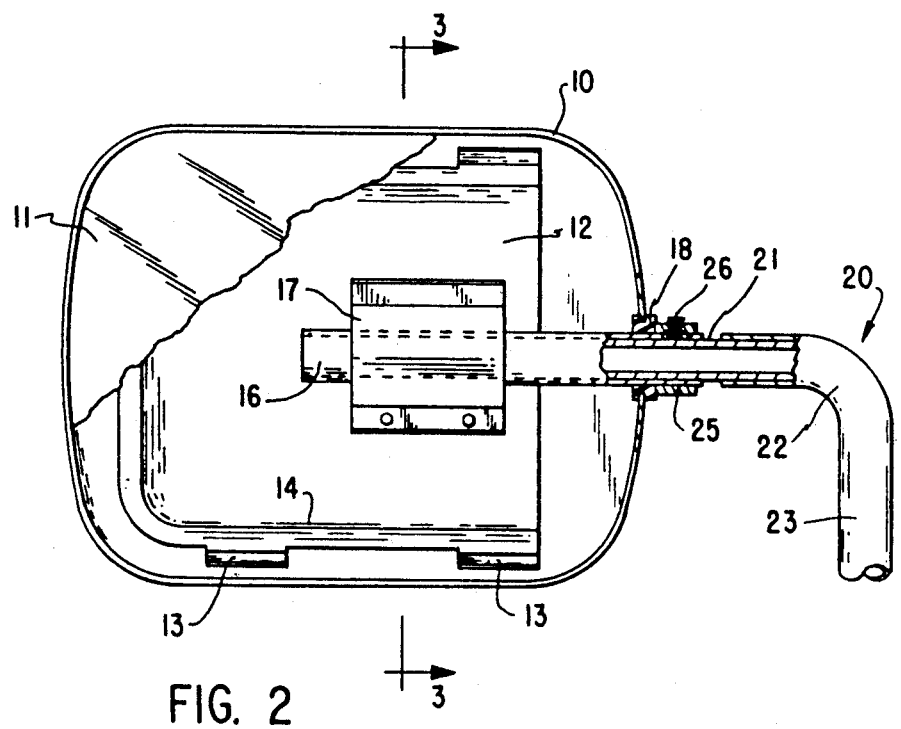
FIG. 2 is an elevational view of the mirror with some of the glass broken away to show underlying parts.

Briefly my invention comprises a mounting device and hardware for an exterior rear view mirror which includes a telescoped joining of the horizontal part of the mounting to provide lateral adjustment of the mirror. More specifically and with reference to the drawings, my device is adapted to be used with an exterior mirror having a back case or head 10 formed in a dished shape and holding a reflecting glass 11.

Within the case 10 a bracket 12 is fixed. This bracket includes ears 13 by which it is fastened to the case, and is formed to provide a peripheral ridge 14. The ridge serves both to support the glass 11 near its periphery and to provide a mounting surface to which the glass may be joined. The bracket 12 also has a valley 15 in which a horizontal tube 16 is firmly held behind a strap 17. In essence, the tube 16 is a permanent part of the case 10, which allows for rotation of the mirror in a vertical plane. The case 10 with its attachments forms a mirror head. A grommet 18 may be used to seal the opening through which the tube 16 extends within the wall of the case 10.

The extension arm assembly 20 allows lateral movement of the mirror head by means including a horizontal extension 21 telescoped with the tube 16. The tube assembly 20 is bent at an elbow 22 to provide a substantially vertical mounting portion 23 adapted to be held by the original mounting bracket on many trucks.

Figure 4:
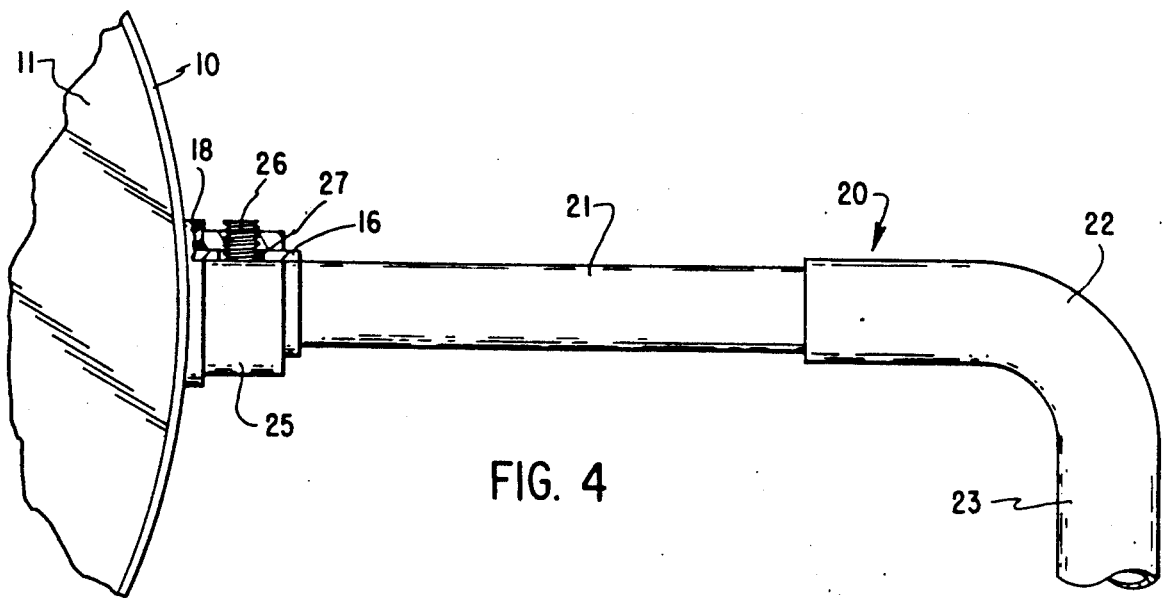
FIG. 4 is a view similar to FIG. 2 to an enlarged scale and showing the securing collar.

It will be obvious that the telescoping action of the extension arm 21 with the tube 16 will provide for adjustment of the mirror toward or away from the cab. In order to hold the tube and its attached mirror head in an adjusted position, I provide a collar 25 into which is threaded a set screw 26. The set screw extends through an opening 27 in the tube 16 (FIG. 4) and presses against the extension arm 21. Thus, by clamping tight against the extension arm and being held in place by the boundaries of the opening 27, the two tubes are held together. In this way any lateral motion of the mirror may be restricted.

Loosening of the set screw 26 again allows lateral relative movement of the tube 16 and thus the case 10 and the mirror head can be moved to a new adjusted position. When that new position is reached, the set screw can again be tightened and the mirror now is useful in the new position.

I claim as my invention:

1. For attachment to a vehicle having a mounting bracket for attachment of a rear view mirror, mounting means for said mirror comprising a tubular first extension arm attachable to said bracket, said first arm including a portion disposed substantially horizontally, second tubular arm means telescopically joined to said first arm whereby said second arm means can be extended and retracted relative to said first arm, a separate collar removably surrounding said second arm means to hold said first arm in position relative to said second arm means, a set screw threaded into said collar extending through said second arm means and adapted to be engaged with said first arm in a clamping engagement and mirror holding means mounted on second arm means.

* * * * *